United States Patent
Terry et al.

(10) Patent No.: US 7,639,989 B2
(45) Date of Patent: *Dec. 29, 2009

(54) WIRELESS COMMUNICATION METHOD AND APPARATUS FOR MINIMIZING OVERHEAD SIGNALING AND OPTIMIZING RADIO RESOURCE UTILIZATION

(75) Inventors: Stephen E. Terry, Northport, NY (US); Stephen G. Dick, Nesconset, NY (US); James M. Miller, Verona, NJ (US); Eldad Zeira, Huntington, NY (US); Ariela Zeira, Huntington, NY (US)

(73) Assignee: InterDigital Technology Corp., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/656,647

(22) Filed: Jan. 23, 2007

(65) Prior Publication Data
US 2007/0117519 A1    May 24, 2007

Related U.S. Application Data

(63) Continuation of application No. 10/768,312, filed on Jan. 30, 2004, now Pat. No. 7,171,163, which is a continuation of application No. 10/029,569, filed on Dec. 21, 2001, now Pat. No. 6,810,236.

(60) Provisional application No. 60/290,877, filed on May 14, 2001.

(51) Int. Cl.
  *H04B 17/00* (2006.01)
(52) U.S. Cl. ............... 455/67.11; 455/450; 455/452.2; 455/456.5; 455/62; 455/509; 370/332; 370/335; 370/350; 370/348

(58) Field of Classification Search ............. 455/67.11, 455/452.2, 62, 509, 512, 450, 452.1, 456.5, 455/102
See application file for complete search history.

(56) References Cited

U.S. PATENT DOCUMENTS
5,375,123 A    12/1994   Andersson et al.
(Continued)

FOREIGN PATENT DOCUMENTS
EP    0 964 540    12/1999
(Continued)

OTHER PUBLICATIONS

3GPP, "3$^{rd}$ Generation Partnership Project; Technical Specification Group Radio Access Network; Physical Layer Procedures (TDD) (Release 1999)," 3GPP TS 25.224 V3.6.0 (Mar. 2001).
(Continued)

*Primary Examiner*—Marceau Milord
(74) *Attorney, Agent, or Firm*—Volpe and Koenig, P.C.

(57) ABSTRACT

A wireless digital communication system includes a base station in communication with a plurality of user equipment mobile terminals (UEs). The system prioritizes the forwarding of blocks of downlink data to designated ones of the UEs. The system employs adaptive modulation and coding (AM&C) to achieve improved radio resource utilization and provides optimum data rates for user services. Blocks of downlink (DL) data are received by the base station which requests downlink (DL) channel quality measurements only from those mobile terminals (UEs) with pending downlink transmissions. The UEs respond to the request by measuring and reporting DL channel quality to the base station, which then allocates resources such that the UEs will make best use of radio resources. The base station notifies the UEs of the physical channel allocation indicating the modulation/coding rate and allocated slots followed by transmission of blocks of downlink data which are transmitted to the UEs.

26 Claims, 2 Drawing Sheets

U.S. PATENT DOCUMENTS

| | | | |
|---|---|---|---|
| 5,428,816 A | 6/1995 | Barnett et al. | |
| 5,701,294 A | 12/1997 | Ward et al. | |
| 5,828,672 A * | 10/1998 | Labonte et al. | 714/708 |
| 5,862,451 A * | 1/1999 | Grau et al. | 725/116 |
| 5,867,478 A | 2/1999 | Baum et al. | |
| 5,940,439 A * | 8/1999 | Kleider et al. | 375/225 |
| 5,949,790 A * | 9/1999 | Pehkonen et al. | 370/465 |
| 5,960,335 A * | 9/1999 | Umemoto et al. | 455/226.2 |
| 6,101,179 A * | 8/2000 | Soliman | 370/342 |
| 6,115,406 A * | 9/2000 | Mesecher | 375/130 |
| 6,137,991 A * | 10/2000 | Isaksson | 455/67.11 |
| 6,167,031 A * | 12/2000 | Olofsson et al. | 370/252 |
| 6,208,663 B1 | 3/2001 | Schramm et al. | |
| 6,298,035 B1* | 10/2001 | Heiskala | 370/206 |
| 6,301,265 B1 | 10/2001 | Kleider et al. | |
| 6,307,867 B1 | 10/2001 | Roobol et al. | |
| 6,330,288 B1 | 12/2001 | Budka et al. | |
| 6,347,071 B1* | 2/2002 | Cupo et al. | 370/203 |
| 6,366,601 B1* | 4/2002 | Ghosh et al. | 375/130 |
| 6,373,877 B1 | 4/2002 | Mesecher | |
| 6,374,118 B1* | 4/2002 | Toskala et al. | 455/522 |
| 6,381,231 B1 | 4/2002 | Silventoinen et al. | |
| 6,381,445 B1 | 4/2002 | Ue et al. | |
| 6,414,946 B1 | 7/2002 | Satou et al. | |
| 6,449,462 B1 | 9/2002 | Gunnarsson et al. | |
| 6,545,997 B1 | 4/2003 | Bohnke et al. | |
| 6,567,665 B1 | 5/2003 | Kissee | |
| 6,584,092 B1 | 6/2003 | Sudo | |
| 6,587,697 B2* | 7/2003 | Terry et al. | 455/522 |
| 6,597,697 B1* | 7/2003 | Petersen | 370/395.64 |
| 6,603,797 B1 | 8/2003 | Zeira et al. | |
| 6,615,054 B2* | 9/2003 | Terry et al. | 455/522 |
| 6,631,123 B1 | 10/2003 | Jiang et al. | |
| 6,700,881 B1 | 3/2004 | Kong et al. | |
| 6,707,808 B1 | 3/2004 | Vedrine | |
| 6,721,569 B1* | 4/2004 | Hashem et al. | 455/450 |
| 6,745,045 B2* | 6/2004 | Terry et al. | 455/522 |
| 6,760,598 B1* | 7/2004 | Kurjenniemi | 455/522 |
| 6,791,960 B1* | 9/2004 | Song | 370/335 |
| 6,810,236 B2* | 10/2004 | Terry et al. | 455/67.11 |
| 6,850,540 B1* | 2/2005 | Peisa et al. | 370/468 |
| 6,909,901 B2* | 6/2005 | Terry et al. | 455/452.2 |
| 6,928,065 B2 | 8/2005 | Logalbo et al. | |
| 6,934,340 B1* | 8/2005 | Dollard | 375/260 |
| 6,947,490 B1* | 9/2005 | Edwards et al. | 375/261 |
| 6,952,591 B2* | 10/2005 | Budka et al. | 455/517 |
| 6,958,989 B1* | 10/2005 | Dick et al. | 370/342 |
| 6,963,540 B2* | 11/2005 | Choi et al. | 370/252 |
| 6,987,746 B1* | 1/2006 | Song | 370/335 |
| 6,990,087 B2 | 1/2006 | Rao et al. | |
| 7,035,234 B2* | 4/2006 | Toskala et al. | 370/329 |
| 7,089,015 B2* | 8/2006 | Fukui | 455/450 |
| 7,116,653 B1* | 10/2006 | Bemmer et al. | 370/335 |
| 7,127,256 B2* | 10/2006 | Terry et al. | 455/452.2 |
| 7,171,163 B2* | 1/2007 | Terry et al. | 455/67.11 |
| 7,209,711 B2* | 4/2007 | Terry et al. | 455/67.11 |
| 7,227,854 B2* | 6/2007 | Kim et al. | 370/342 |
| 7,236,474 B2* | 6/2007 | Seo et al. | 370/329 |
| 7,260,405 B2 | 8/2007 | Kim et al. | |
| 7,274,947 B2* | 9/2007 | Koo et al. | 455/522 |

FOREIGN PATENT DOCUMENTS

| | | |
|---|---|---|
| EP | 0 986 282 | 3/2000 |
| EP | 1 024 622 | 8/2000 |
| EP | 1 024 622 A2 | 8/2000 |
| GB | 2266433 | 10/1993 |
| KR | 20010038996 | 5/2001 |
| KR | 20010073145 | 7/2001 |
| RU | 2 122 288 | 11/1998 |
| RU | 2122288 | 11/1998 |
| RU | 2129761 | 4/1999 |
| RU | 2138915 | 9/1999 |
| RU | 2138926 | 9/1999 |
| RU | 2141726 | 11/1999 |
| RU | 2197779 | 1/2003 |
| TW | 192647 | 10/1993 |
| WO | 97/37457 | 10/1997 |
| WO | 98/03030 | 1/1998 |
| WO | 98/21910 | 5/1998 |
| WO | 99/10991 | 3/1999 |
| WO | 00/51390 | 8/2000 |
| WO | 00/72496 | 11/2000 |
| WO | 00/72496 A1 | 11/2000 |
| WO | 02/32179 | 4/2002 |
| WO | 02/032179 | 4/2002 |
| WO | 02/093847 | 11/2002 |
| WO | 02/093951 | 11/2002 |
| WO | 2004/042960 | 5/2004 |

OTHER PUBLICATIONS

3GPP, "3$^{rd}$ Generation Partnership Project; Technical Specification Group Radio Access Network; Physical Layer Procedures (TDD) (Release 1999)," 3GPP TS 25.224 V3.8.0 (Sep. 2001).

3GPP, "3$^{rd}$ Generation Partnership Project; Technical Specification Group Radio Access Network; Physical Layer Procedures (TDD) (Release 4)," 3GPP TS 25.224 V4.2.0 (Sep. 2001).

3GPP, "3$^{rd}$ Generation Partnership Project; Technical Specification Group Radio Access Network; Physical Layer Procedures (TDD) (Release 4)," 3GPP TS 25.224 V4.0.0 (Mar. 2001).

3GPP, "3$^{rd}$ Generation Partnership Project; Technical Specification Group Radio Access Network; UTRA High Speed Downlink Packet Access (HSDPA); Overall description; Stage 2 (Release 5)," 3GPP TS 25.308 V5.0.0 (Sep. 2001).

3GPP, "3$^{rd}$ Generation Partnership Project; Technical Specification Group Radio Access Network; Physical layer procedures (FDD) (Release 4)," 3GPP TS 25.214 V4.0.0 (Mar. 2001).

3GPP, "3$^{rd}$ Generation Partnership Project; Technical Specification Group Radio Access Network; Physical layer procedures (FDD) (Release 1999)," 3GPP TS 25.214 V3.8.0 (Sep. 2001).

3GPP, "3$^{rd}$ Generation Partnership Project; Technical Specification Group Radio Access Network; Physical layer procedures (FDD) (Release 1999)," 3GPP TS 25.214 V3.6.0 (Mar. 2001).

3GPP, "3$^{rd}$ Generation Partnership Project; Technical Specification Group Radio Access Network; Physical layer procedures (FDD) (Release 4)," 3GPP TS 25.214 V4.2.0 (Sep. 2001).

3GPP, "3$^{rd}$ Generation Partnership Project; Technical Specification Group Radio Access Network; Multiplexing and channel coding (TDD) (Release 4)," 3GPP TS 25.222 V4.1.0 (Sep. 2001).

3GPP, "3$^{rd}$ Generation Partnership Project; Technical Specification Group Radio Access Network; Multiplexing and channel coding (TDD) (Release 4)," 3GPP TS 25.222 V4.0.0 (Mar. 2001).

3GPP, "3$^{rd}$ Generation Partnership Project; Technical Specification Group Radio Access Network; Multiplexing and channel coding (TDD) (Release 1999)," 3GPP TS 25.222 V3.7.0 (Sep. 2001).

3GPP, "3$^{rd}$ Generation Partnership Project; Technical Specification Group Radio Access Network; Multiplexing and channel coding (TDD) (Release 1999)," 3GPP TS 25.222 V3.6.0 (Mar. 2001).

3GPP, "3$^{rd}$ Generation Partnership Project; Technical Specification Group Radio Access Network; UTRAN Iub Interface NBAP signaling (Release 1999)," 3GPP TS 25.433 V3.7.0 (Sep. 2001).

3GPP, "3$^{rd}$ Generation Partnership Project; Technical Specification Group Radio Access Network; UTRAN Iub Interface NBAP signaling (Release 1999)," 3GPP TS 25.433 V3.5.0 (Mar. 2001).

3GPP, "3$^{rd}$ Generation Partnership Project; Technical Specification Group Radio Access Network; UTRAN Iub Interface NBAP signaling (Release 4)," 3GPP TS 25.433 V4.0.0 (Mar. 2001).

3GPP, "3$^{rd}$ Generation Partnership Project; Technical Specification Group Radio Access Network; UTRAN Iub Interface NBAP signaling (Release 4)," 3GPP TS 25.433 V4.2.1 (Sep. 2001).

3GPP, "3rd Generation Partnership Project; Technical Specification Group Radio Access Network; RRC Protocol Specification (Release 4)," 3GPP TS 25.331 V4.2.1 (Oct. 2001).

3GPP, "3rd Generation Partnership Project; Technical Specification Group Radio Access Network; RRC Protocol Specification (Release 1999)," 3GPP TS 25.331 V3.6.0 (Mar. 2001).

3GPP, "3rd Generation Partnership Project; Technical Specification Group Radio Access Network; RRC Protocol Specification (Release 4)," 3GPP TS 25.331 V4.0.0 (Mar. 2001).

3GPP, "3rd Generation Partnership Project; Technical Specification Group Radio Access Network; RRC Protocol Specification (Release 1999)," 3GPP TS 25.331 V3.8.0 (Sep. 2001).

3GPP, "3rd Generation Partnership Project; Technical Specification Group Radio Access Network; MAC protocol specification (Release 4)," 3GPP TS 25.331 V4.2.0 (Sep. 2001).

3GPP, "3rd Generation Partnership Project; Technical Specification Group Radio Access Network; MAC protocol specification (Release 4)," 3GPP TS 25.321 V4.0.0 (Mar. 2001).

3GPP, "3rd Generation Partnership Project; Technical Specification Group Radio Access Network; MAC protocol specification (Release 1999)," 3GPP TS 25.321 V3.9.0 (Sep. 2001).

3GPP, "3rd Generation Partnership Project; Technical Specification Group Radio Access Network; MAC protocol specification (Release 1999)," 3GPP TS 25.321 V3.7.0 (Sep. 2001).

3GPP, "3rd Generation Partnership Project; Technical Specification Group Radio Access Network; Physical Layer Procedures (TDD) (Release 1999)," 3GPP TS 25.224 V3.9.0 (Sep. 2001).

3GPP, "3rd Generation Partnership Project; Technical Specification Group Radio Access Network; Physical Layer Procedures (TDD) (Release 4)," 3GPP TS 25.224 V4.2.0 (Sep. 2001).

3GPP, "3rd Generation Partnership Project; Technical Specification Group Radio Access Network; Physical Layer Procedures (TDD) (Release 4)," 3GPP TS 25.224 V4.0.0 (Mar. 2001).

3GPP, "3rd Generation Partnership Project; Technical Specification Group Radio Access Network; UTRA High Speed Downlink Packet Access (HSDPA); Overall description; State 2 (Release 5)," 3GPP TS 25.308 V5.0.0 (Sep. 2001).

3GPP, "3rd Generation Partnership Project; Technical Specification Group Radio Access Network; Physical layer procedures (FDD) (Release 4)," 3GPP TS 25.214 V4.0.0 (Mar. 2001).

3GPP, "3rd Generation Partnership Project; Technical Specification Group Radio Access Network; Physical layer procedures (FDD) (Release 1999)," 3GPP TS 25.214 V3.8.0 (Sep. 2001).

3GPP, "3rd Generation Partnership Project; Technical Specification Group Radio Access Network; Physical layer procedures (FDD) (Release 1999)," 3GPP TS 25.214 V3.6.0 (Mar. 2001).

3GPP, "3rd Generation Partnership Project; Technical Specification Group Radio Access Network; Physical layer procedures (FDD) (Release 4)," 3GPP TS 25.214 V4.2.0 (Sep. 2001).

3GPP, "3rd Generation Partnership Project; Technical Specification Group Radio Access Network; Multiplexing and channel coding (TDD) (Release 4)," 3GPP TS 25.222 V4.1.0 (Sep. 2001).

3GPP, "3rd Generation Partnership Project; Technical Specification Group Radio Access Network; Multiplexing and channel coding (TDD) (Relase 4)," 3GPP TS 25.222 V4.0.0 (Mar. 2001).

3GPP, "3rd Generation Partnership Project; Technical Specification Group Radio Access Network; Multiplexing and channel coding (TDD) (Relase 1999)," 3GPP TS 25.222 V3.7.0 (Sep. 2001).

3GPP, "3rd Generation Partnership Project; Technical Specification Group Radio Access Network; Multiplexing and channel coding (TDD) (Release 1999)," 3GPP TS 25.222 V3.6.0 (Mar. 2001).

3GPP, "3rd Generation Partnership Project; Technical Specification Group Radio Access Network; UTRAN lub Interface NBAP signaling (Release 1999)," 3GPP TS 25.433 V3.7.0 (Sep. 2001).

3GPP, "3rd Generation Partnership Project; Technical Specification Group Radio Access Network; UTRAN lub Interface NBAP signaling (Release 1999)," 3GPP TS 25.433 V3.5.0 (Mar. 2001).

3GPP, "3rd Generation Partnership Project; Technical Specification Group Radio Access Network; UTRAN lub Interface NBAP signaling (Release 4)," 3GPP TS 25.433 V4.0.0 (Mar. 2001).

3GPP, "3rd Generation Partnership Project; Technical Specification Group Radio Access Network; UTRAN lub Interface NBAP signaling (Release 4)," 3GPP TS 25.433 V4.2.1 (Sep. 2001).

3GPP, "3rd Generation Partnership Project; Technical Specification Group Radio Access Network; RRC Protocol Specification (Release 4)," 3GPP TS 25.331 V4.2.1 (Oct. 2001).

3GPP, "3rd Generation Partnership Project; Technical Specification Group Radio Access Network; RRC Protocol Specification (Release 1999)," 3GPP TS 25.331 V3.6.0 (Mar. 2001).

3GPP, "3rd Generation Partnership Project; Technical Specification Group Radio Access Network; RRC Protocol Specification (Release 4)," 3GPP TS 25.331 V4.0.0 (Mar. 2001).

3GPP, "3rd Generation Partnership Project; Technical Specification Group Radio Access Network; RRC Protocol Specification (Release 1999)," 3GPP TS 25.331 V3.8.0 (Sep. 2001).

3GPP, "3rd Generation Partnership Project; Technical Specification Group Radio Access Network; MAC protocol specification (Release 4)," 3GPP TS 25.321 V4.2.0 (Sep. 2001).

3GPP, "3rd Generation Partnership Project; Technical Specification Group Radio Access Network; MAC protocol specification (Release 4)," 3GPP TS 25.321 V4.0.0 (Mar. 2001).

3GPP, "3rd Generation Partnership Project; Technical Specification Group Radio Access Network; MAC protocol specification (Release 1999)," 3GPP TS 25.321 V3.9.0 (Sep. 2001).

3GPP, "3rd Generation Partnership Project; Technical Specification Group Radio Access Network; MAC protocol specification (Release 1999)," 3GPP TS 25.321 V3.7.0 (Sep. 2001).

3GPP, "3rd Generation Partnership Project; Technical Specification Group Radio Access Network; Physical Layer Procedures (TDD) (Release 1999)," 3GPP TS 25.224 V3.6.0 (Mar. 2001).

3GPP, "3rd Generation Partnership Project; Technical Specification Group Radio Access Network; Physical Layer Procedures (TDD) (Release 1999)," 3GPP TS 25.224 V3.8.0 (Sep. 2001).

3GPP, "3rd Generation Partnership Project; Technical Specification Group Radio Access Network; Physical Layer Procedures (TDD) (Release 4)," 3GPP TS 25.224 V4.2.0 (Sep. 2001).

3GPP, "3rd Generation Partnership Project; Technical Specification Group Radio Access Network; Physical Layer Procedures (TDD) (Release 4)," 3GPP TS 25.224 V4.0.0 (Mar. 2001).

3GPP, "3rd Generation Partnership Project; Technical Specification Group Radio Access Network; UTRA High Speed Downlink Packet Access (HSDPA); Overall description; State 2 (Release 5)," 3GPP TS 25.308 V5.0.0 (Sep. 2001).

3GPP, "3rd Generation Partnership Project; Technical Specification Group Radio Access Network; Physical layer procedures (FDD) (Release 4)," 3GPP TS 25.214 V4.0.0 (Mar. 2001).

3GPP, "3rd Generation Partnership Project; Technical Specification Group Radio Access Network; Physical layer procedures (FDD) (Release 1999)," 3GPP TS 25.214 V3.8.0 (Sep. 2001).

3GPP, "3rd Generation Partnership Project; Technical Specification Group Radio Access Network; Physical layer procedures (FDD) (Release 1999)," 3GPP TS 25.214 V3.6.0 (Mar. 2001).

3GPP, "3rd Generation Partnership Project; Technical Specification Group Radio Access Network; Physical layer procedures (FDD) (Release 4)," 3GPP TS 25.214 V4.2.0 (Sep. 2001).

3GPP, "3rd Generation Partnership Project; Technical Specification Group Radio Access Network; Multiplexing and channel coding (TDD) (Release 4)," 3GPP TS 25.222 V4.1.0 (Sep. 2001).

3GPP, "3rd Generation Partnership Project; Technical Specification Group Radio Access Network; Multiplexing and channel coding (TDD) (Release 4)," 3GPP TS 25.222 V4.0.0 (Mar. 2001).

3GPP, "3rd Generation Partnership Project; Technical Specification Group Radio Access Network; Multiplexing and channel coding (TDD) (Release 1999)," 3GPP TS 25.222 V3.7.0 (Sep. 2001).

3GPP, "3rd Generation Partnership Project; Technical Specification Group Radio Access Network; Multiplexing and channel coding (TDD) (Release 1999)," 3GPP TS 25.222 V3.6.0 (Mar. 2001).

3GPP, "3rd Generation Partnership Project; Technical Specification Group Radio Access Network; UTRAN lub Interface NBAP signaling (Release 1999)," 3GPP TS 25.433 V3.7.0 (Sep. 2001).

3GPP, "3rd Generation Partnership Project; Technical Specification Group Radio Access Network; UTRAN lub Interface NBAP signaling (Release 1999)," 3GPP TS 25.433 V3.5.0 (Mar. 2001).

3GPP, "3rd Generation Partnership Project; Technical Specification Group Radio Access Network; UTRAN lub Interface NBAP signaling (Release 4)," 3GPP TS 25.433 V4.0.0 (Mar. 2001).

3GPP, "3rd Generation Partnership Project; Technical Specification Group Radio Access Network; UTRAN Iub Interface NBAP signaling (Release 4)," 3GPP TS 25.433 V4.2.1 (Sep. 2001).

3GPP, "3rd Generation Partnership Project; Technical Specification Group Radio Access Network; RRC Protocol Specification (Release 4)," 3GPP TS 25.331 V4.2.1 (Oct. 2001).

3GPP, "3rd Generation Partnership Project; Technical Specification Group Radio Access Network; RRC Protocol Specifiation (Release 1999)," 3GPP TS 25.331 V3.6.0 (Mar. 2001).

3GPP, "3rd Generation Partnership Project; Technical Specification Group Radio Access Network; RRC Protocol Specification (Release 4)," 3GPP TS 25.331 V4.0.0 (Mar. 2001).

3GPP, "3rd Generation Partnership Project; Technical Specification Group Radio Access Network; RRC Protocol Specification (Release 1999)," 3GPP TS 25.331 V3.8.0 (Sep. 2001).

3GPP, "3rd Generation Partnership Project; Technical Specification Group Radio Access Network; MAC protocol specification (Release 4)," 3GPP TS 25.321 V4.2.0 (Sep. 2001).

3GPP, "3rd Generation Partnership Project; Technical Specification Group Radio Access Network; MAC protocol specification (Release 4)," 3GPP TS 25.321 V4.0.0 (Mar. 2001).

3GPP, "3rd Generation Partnership Project; Technical Specification Group Radio Access Network; MAC protocol specification (Release 1999)," 3GPP TS 25.321 V3.9.0 (Sep. 2001).

3GPP, "3rd Generation Partnership Project; Technical Specification Group Radio Access Network; MAC protocol specification (Release 1999)," 3GPP TS 25.321 V3.7.0 (Sep. 2001).

3GPP, "3rd Generation Partnership Project; Technical Specification Group Radio Access Network; Physical Layer Procedures (TDD) (Release 1999)," 3GPP TS 25.224 V3.6.0 (Mar. 2001).

3GPP, "3rd Generation Partnership Project; Technical Specification Group Radio Access Network; Physical Layer Procedures (TDD) (Release 1999)," 3GPP TS 25.224 V3.8.0 (Sep. 20001).

3GPP, "3rd Generation Partnership Project; Technical Specification Group Radio Access Network; Physical Layer Procedures (TDD) (Release 4)," 3GPP TS 25.224 V4.2.0 (Sep. 2001).

3GPP, "3rd Generation Partnership Project; Technical Specification Group Radio Access Network; Physical Layer Procedures (TDD) (Release 4)," 3GPP TS 25.224 V4.0.0 (Mar. 2001).

3GPP, "3rd Generation Partnership Project; Technical Specification Group Radio Access Network; UTRA High Speed Downlink Packet Access (HSDPA); Overall description; Stage 2 (Release 5)," 3GPP TS 25.308 V5.0.0 (Sep. 2001).

3GPP, "3rd Generation Partnership Project; Technical Specification Group Radio Access Network; Physical layer procedures (FDD) (Release 4)," 3GPP TS 25.214 V4.0.0 (Mar. 2001).

* cited by examiner

WIRELESS COMMUNICATION METHOD AND APPARATUS FOR MINIMIZING OVERHEAD SIGNALING AND OPTIMIZING RADIO RESOURCE UTILIZATION

CROSS REFERENCE TO RELATED APPLICATIONS

This application is a continuation of U.S. patent application Ser. No. 10/768,312, filed Jan. 30, 2004, which issued as U.S. Pat. No. 7,171,163 on Jan. 30, 2007, which is a continuation of U.S. patent application Ser. No. 10/029,569, filed Dec. 21, 2001, which issued as U.S. Pat. No. 6,810,236 on Oct. 26, 2004, which claims the benefit of U.S. Provisional Patent Application No. 60/290,877, filed May 14, 2001, which applications are incorporated herein by reference.

BACKGROUND

The present invention relates to wireless digital communication systems. More particularly, the present invention relates to communication stations which employ code-division multiple access (CDMA) technology. Specifically, the present invention relates to determining radio conditions for use in optimizing radio resource utilization as well as selecting data rates for user services.

In code-division multiple access (CDMA) third generation (3G) cellular telecommunication systems, adaptive modulation and coding (AM&C) techniques are applied to transmissions in order to achieve improved radio resource utilization and provide increased data rates for user services under appropriate conditions. These AM&C techniques take into account radio conditions in advance of transmissions in order to determine modulation and coding rates that take the greatest advantage of current radio propagation conditions utilizing these techniques.

Utilizing these AM&C techniques, a procedure is required that provides a physical channel quality measurement from the receiver in advance of each transmission. Based on this quality measurement, the transmitter determines the appropriate modulation and coding rate for the particular transmission.

In CDMA systems, as with any wireless systems, radio conditions can change rapidly due to a wide variety of both natural and man-made conditions. Since the channel quality measurement is used to determine transmission modulation and coding, and since channel quality changes rapidly due to the changing conditions of the transmission path, the performance of the adaptive transmission process is directly related to the length of the time period between when the channel quality measurement is performed and when the transmission is initiated.

Physical or logical control channels are then used to transfer the channel quality measurements from the receiver to the transmitter. Channel quality signaling may utilize either dedicated control channels to each user equipment (UE) or common control channels shared by all UEs. A UE may be a cellular phone, PDA (personal data assistant) or any other type of wireless device. When dedicated control channels are used, a continuous signaling channel is available over time for propagation of channel quality measurements for each UE. This is an optimal solution for AM&C since the quality measurement is continuously available. Transmissions can occur at any time, taking into account the continuously available quality measurement for appropriate modulation and coding settings. Additionally, with a dedicated control channel always available in the uplink, the channel can be also used to support low rate uplink data transmissions.

The difficulty with the dedicated control channel approach is that physical resources are continuously allocated even when there is no data to transmit. A primary application of AM&C techniques is non-real time high data rate services, for example, Internet access. For these classes of service, the best quality of service (QoS) is achieved with short, high rate transmissions with relatively long idle periods between each transmission. These long idle periods result in an inefficient use of dedicated resources.

The problem can be minimized with pre-configured periodic dedicated channel allocations. But this results in periodic availability of quality measurements. If the quality measurements are not continuously available, for UEs which have transmissions at any one point in time, only some portion of the UEs will have recent channel quality measurements.

Another alternative is the use of common control channels. With common control channels, a continuous signaling channel exists that is shared between all UEs within the cell. Procedures are defined for determining each UEs access to the common control channel. UE identities are used to distinguish UE specific transactions.

The difficulty with the common control approach for support of AM&C is the large amount of signaling overhead necessary to administrate each UE's access to the control channel. As aforementioned, UE identities are required to distinguish UE specific transactions. Additionally, to avoid contention-based access to the uplink common control channel, individual allocations are required to be signaled on the downlink common control channel for each UE's access. Since uplink transmissions cannot always be predicted, periodic allocations of the uplink control channel must be signaled on the downlink common control channel, which results in considerable signaling overhead. Also, the common control approach does not provide for low rate, uplink data transmissions.

In summary, the efficient performance of AM&C techniques is primarily based on the availability of recent physical channel quality measurements from the receiver in advance of each transmission. Optimally, measurements are available with minimal latency for all users with active data transmissions. The dedicated control channel solution provides continuous measurements, but since transmissions are discontinuous, this is an inefficient use of radio resources. Periodic configured dedicated control channels minimize the radio resource requirement, but this increases measurement latency. The common control channel method can provide measurements on a continuous or periodic basis, but the signaling overhead results in an inefficient use of radio resources.

There exists a need for a system that provides channel quality measurements with low latency and low signaling overhead.

BRIEF DESCRIPTION OF THE DRAWING(S)

The objectives of the present invention will become apparent upon consideration of the accompanying detailed description and figures, in which.

DETAILED DESCRIPTION OF THE PREFERRED EMBODIMENT(S)

Presently preferred embodiments are described below with reference to the drawing figures wherein like numerals represent like elements throughout.

Figure 1:
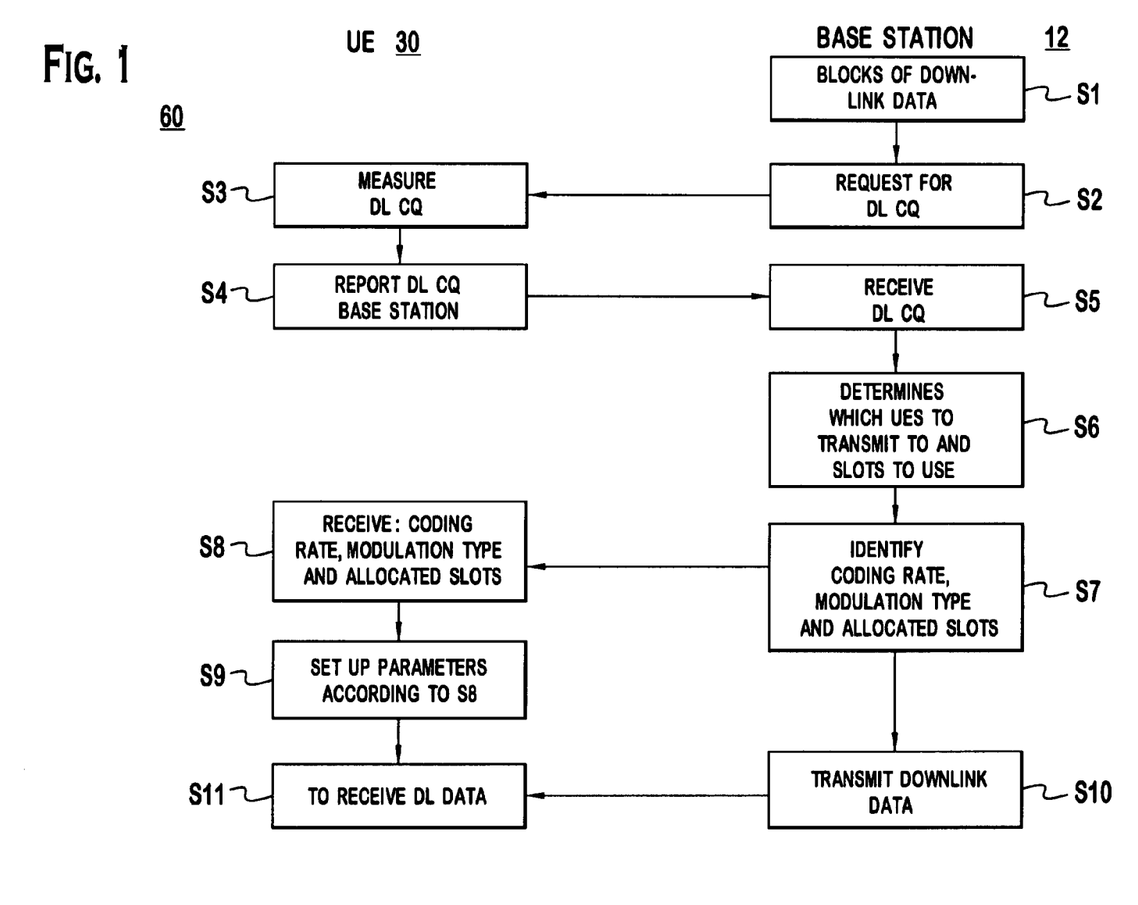
FIG. 1 is a flow chart illustrating one preferred Dynamic Channel Quality Measurement Procedure (DCQMP) of the present invention.

FIG. 1 is a flow diagram which illustrates the dynamic channel quality (CQ) measurement procedure 60 of the present invention which may be implemented by a wireless digital communication system having a base station/node B (hereinafter base station 12) which communicates with at least one UE 30. Although it is intended for the presently inventive method to support communications between a base station and a plurality of UEs, for simplicity the following description will detail the steps performed by a single UE, it being understood that other UEs will operate in a similar manner.

Blocks of downlink (DL) data are transferred to the base station 12 which are designated for a particular UE 30 (step S1).

The base station 12, responsive to receipt of downlink data and in advance of a transmission to the UE 30, requests DL CQ measurements only from a UE 30 having pending downlink transmissions (step S2).

The UE 30 receives the request and makes the requested CQ measurement at step S3 and reports the DL CQ measurement to the base station 12 at step S4.

Based on the CQ measurement reports received from each UE (step S5), the base station 12 determines which of the UEs will make the best use of radio resources, and determines which slots to use (step S6). Preferably, the UEs are prioritized by their CQ so that the UE with the highest CQ is sent its data first and then the UE with the second highest CQ is sent its data second, and so on until the UE with the lowest CQ is sent its data last.

Since the CQ measurement requests and the responsive CQ measurement reports are only generated when needed, the signaling overhead required for a common control channel is greatly reduced. Measurement reports are available for all active transmitting users, similar to the dedicated control channel case, but avoiding the resource inefficiency during idle periods.

The priority of transmissions is determined according to the DL CQ measurements, and the DL physical channel allocation is signaled to the appropriate UEs, indicating the particular coding rate, modulation type and allocated slots (step S7). The designated UE receives the coding rate, modulation type and allocated slots (step S8), and sets these parameters for reception (step S9).

Blocks of downlink data are then transmitted by the base station 12 to the designated UE 30 (step S10) a given, but short, time after performance of step S7 to enable the UE 30 time to set up for reception. The UE 30 receives the downlink data (step S11) at the specified coding rate, modulation type and in the allocated slots specified at step S7.

The present invention thus provides the fundamental requirements for AM&C operation while maintaining the most efficient use of radio resources. Since DL CQ measurements are available with the minimum possible latency for all transmissions, the choice of the best user(s) to provide service in the next transmission time frame is optimized. Additionally, measurements provided by periodic or continuous mechanisms do not provide increased benefit, performance gain or enhancement over the present invention.

Implementation of the present invention also minimizes measurement processing and the associated power consumption, especially important in the UE, which is typically powered by a small power source of limited capacity, (i.e. a chargeable battery). Since a quality measurement is only requested for a particular active transmission, the number of required measurements are minimized.

Figure 2:
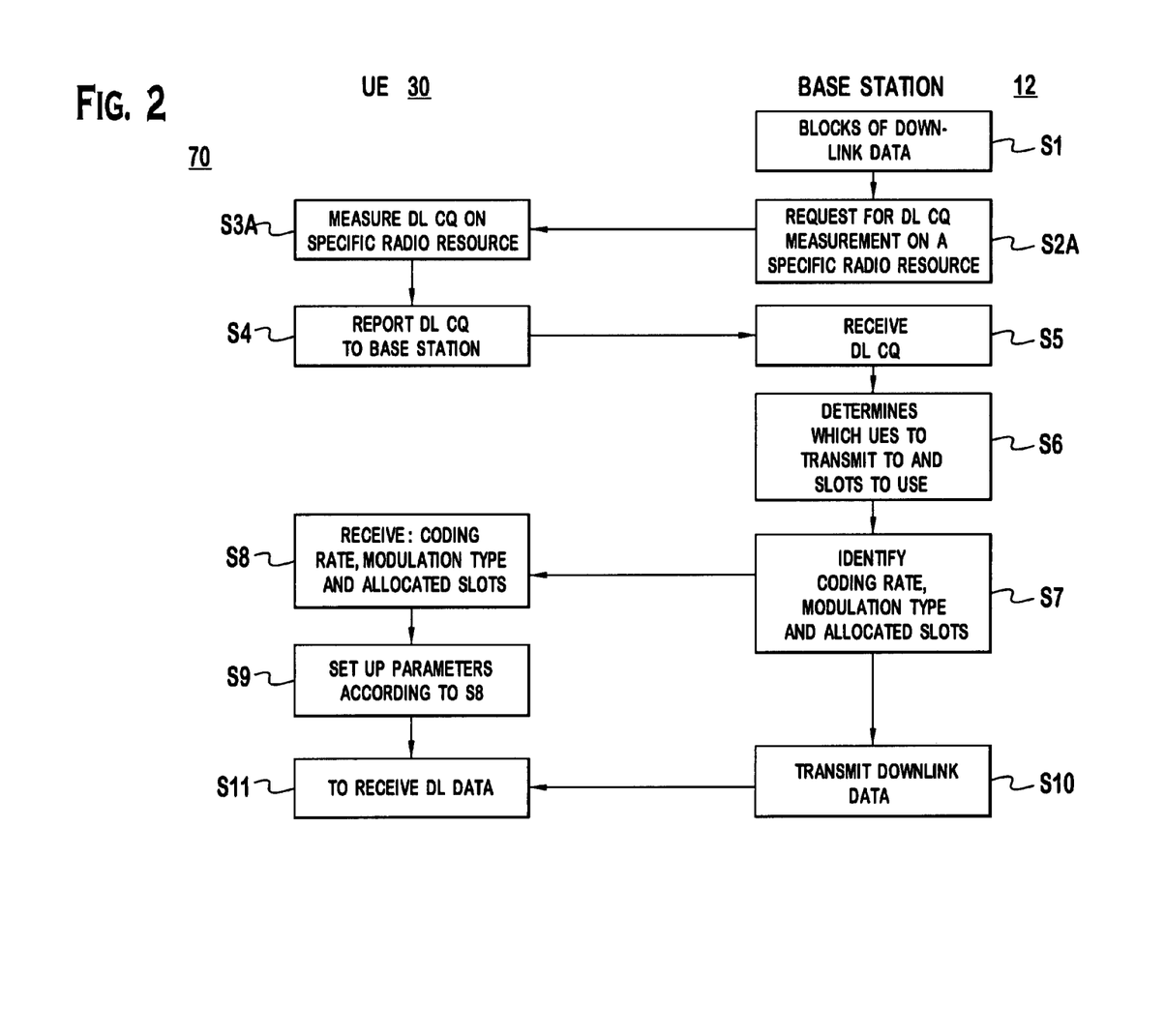
FIG. 2 shows an alternative embodiment of the DCQMP of the present invention shown in FIG. 1.

In accordance with an alternative embodiment of the method 70 of the present invention shown in FIG. 2, only certain quality measurements may be required depending on the radio resources used for a particular transmission. For example, in the 3G standards, the CQ for only specific physical timeslots may be requested. Therefore, the number of measurements performed is reduced by limiting the requirement of a CQ measurement to only active transmissions and, depending on the scale of the transmission, only requiring measurement on particular radio resources, (i.e., specific time slots). This is shown in FIG. 2, which is similar to FIG. 1 except for modified steps S2A and S3A, which replace steps S2 and S3 respectively of FIG. 1. In step S2A, the base station 12 requests the UE 30 to perform a measurement only on a particular radio resource. In response, the UE performs the DL CQ measurement on the specified radio resource (step S3A).

The present invention provides many advantages over prior art schemes. First, the invention provides the highest efficiency utilization of the air interface since only those UEs having pending transmissions will be required to respond to a request for DL CQ measurements. This permits the overhead signaling to be at a minimum.

Second, since the transmissions are prioritized according to the highest quality DL CQ measurements, the highest data rates permissible will be achieved for each time slot or multiple time slots.

Third, since UEs are only required to respond to the request for the DL CQ measurements, unnecessary measurements by the UEs will not be required, thereby saving the battery life of the UEs.

A final advantage of the present invention is the increased number of users that may be supported in a cell for both of the methods disclosed herein. The number of users that are supported is limited in the dedicated control channel method by the requirement for dedicated radio resources; and in the common control channel method by signaling overhead requirements. By limiting the measurement signaling procedures to active users, the present invention minimizes the common control signaling overhead and supports the greatest number of users in the cell.

While the present invention has been described in terms of the preferred embodiment, other variations which are within the scope of the invention as outlined in the claims below will be apparent to those skilled in the art.

What is claimed is:

1. A method of minimizing overhead signaling and optimizing radio resource utilization, the method comprising:

determining a first subset of a plurality of user equipment mobile terminals (UEs) that have pending downlink transmissions;

determining a second subset of the plurality of UEs that do not have pending downlink transmissions;

transmitting a request to each of the UEs in the first subset to begin channel quality (CQ) measurements, whereby a request to begin CQ measurements is not sent to any of the UEs in the second subset; and receiving CQ measurement results from each of the UEs in the first subset in response to the request to begin CQ measurements.

2. The method of claim 1 further comprising:
receiving downlink data associated with the pending downlink transmissions;
signaling an allocation of radio resources, determined based on the CQ measurement results, to each of the UEs in the first subset; and
transmitting the downlink data to the UEs in the first subset in accordance with the allocation of radio resources.

3. The method of claim 2 wherein different allocations of radio resources are signaled to different ones of the UEs in the first subset.

4. The method of claim 2 wherein the request to begin CQ measurements is transmitted to each of the UEs in the first subset in response to receiving the downlink data.

5. The method of claim 2 wherein the allocation of radio resources includes at least one of a particular coding rate, a modulation type and an allocated time slot.

6. The method of claim 2 further comprising:
determining which of the UEs in the first subset will make the best use of radio resources.

7. The method of claim 2 further comprising:
determining specific time slots that the UEs in the first subset should use to receive the downlink data.

8. The method of claim 2 wherein the UEs in the first subset perform CQ measurements until all of the received downlink data has been sent to the UEs in the first subset.

9. The method of claim 1 wherein each request to begin CQ measurements is transmitted over a common control channel or a dedicated control channel.

10. The method of claim 1 wherein each request to begin CQ measurements indicates at least one particular radio resource upon which a UE that receives the request is to perform the CQ measurements.

11. A method of minimizing overhead signaling and optimizing radio resource utilization, the method comprising:
receiving downlink data;
transmitting a request to begin channel quality (CQ) measurements;
receiving CQ measurement results in response to the request;
signaling an allocation of radio resources, the allocation of resources being based on the received CQ measurement results; and
transmitting the received downlink data in accordance with the allocation of radio resources.

12. The method of claim 11 wherein the allocation of radio resources includes at least one of a particular coding rate, a modulation type and an allocated time slot.

13. The method of claim 11 wherein each request to begin CQ measurements is transmitted over a common control channel or a dedicated control channel.

14. The method of claim 11 wherein the request to begin CQ measurements indicates at least one particular radio resource upon which the CQ measurements are to be performed.

15. A base station comprising:
a receiver configured to receive downlink data;
a transmitter configured to transmit a request to begin channel quality (CQ) measurements;
the receiver being further configured to receive CQ measurement results in response to the request; and
the transmitter being further configured to signal an allocation of radio resources, the allocation of resources being based on the CQ measurement results, and to transmit the received downlink data in accordance with the allocation of radio resources.

16. The base station of claim 15 wherein the allocation of radio resources includes at least one of a particular coding rate, a modulation type and an allocated time slot.

17. The base station of claim 15 wherein each request to begin CQ measurements is transmitted over a common control channel or a dedicated control channel.

18. The base station of claim 15 wherein the request to begin CQ measurements indicates at least one particular radio resource upon which the CQ measurements are to be performed.

19. A method of minimizing overhead signaling and optimizing radio resource utilization, the method comprising:
receiving a request to provide a channel quality (CQ) measurement report;
transmitting a CQ measurement report in response to the request;
receiving an allocation of radio resources that is based on the transmitted CQ measurement report; and
receiving downlink data in accordance with the allocation of radio resources.

20. The method of claim 19 wherein the allocation of radio resources includes at least one of a coding rate and a modulation type.

21. The method of claim 19 wherein the request to provide a CQ measurement report is received over a common control channel or a dedicated control channel.

22. The method of claim 19 wherein the request to provide a CQ measurement report indicates at least one particular radio resource upon which the CQ measurements is to be based.

23. A user equipment mobile terminal (UE) comprising:
a receiver configured to receive a request to provide a channel quality (CQ) measurement report;
a transmitter configured to transmit CQ measurement report in response to the request; and
the receiver being further configured to receive an allocation of radio resources that is based on the transmitted CQ measurement report, and to receive downlink data in accordance with the allocation of radio resources.

24. The UE of claim 23 wherein the allocation of radio resources includes at least one of a coding rate, and a modulation type.

25. The UE of claim 23 wherein each request to provide a CQ measurement report is transmitted over a common control channel or a dedicated control channel.

26. The UE of claim 23 wherein the request to provide a CQ measurement report indicates at least one radio resource upon which the CQ measurement report is to be based.

* * * * *

UNITED STATES PATENT AND TRADEMARK OFFICE
CERTIFICATE OF CORRECTION

| | | |
|---|---|---|
| PATENT NO. | : 7,639,989 B2 | Page 1 of 2 |
| APPLICATION NO. | : 11/656647 | |
| DATED | : December 29, 2009 | |
| INVENTOR(S) | : Terry et al. | |

It is certified that error appears in the above-identified patent and that said Letters Patent is hereby corrected as shown below:

ON THE TITLE PAGE

At Item (56), OTHER PUBLICATIONS, page 3, left column, line 15, before "V4.2.0" delete "25.331" and insert therefor --25.321--.

At Item (56), OTHER PUBLICATIONS, page 3, left column, line 27, before "(Sep. 2001)." delete "V3.9.0" and insert therefor --V3.8.0--.

IN THE CLAIMS

At claim 1, column 4, line 54, before the word "overhead" delete "minimizing" and insert therefor --determining--.

At claim 1, column 4, lines 54 & 55, after the words "signaling and" delete "opti-mizing".

At claim 1, column 4, delete lines 62-64 and insert therefor --to take a channel quality (CQ) measurement; and--.

At claim 1, column 4, lines 66 & 67, after the words "request to" delete "begin CQ measurements." and insert therefor --take a CQ measurement.--.

At claim 2, column 5, lines 4 & 5, after the word "radio" delete "resources, determined based on" and insert therefor --resources in response to--.

At claim 4, column 5, lines 14 & 15, after the words "request to" delete "begin CQ measurements" and insert therefor --take a CQ measurement--.

At claim 5, column 5, lines 18 & 19, after the words "one of a" delete "particular coding rate, a modulation type and an allocated time slot.", and insert therefor --coding rate and a modulation type.--.

At claim 9, column 5, lines 30 & 31, after the words "request to" delete "begin CQ measurements" and insert therefor --take a CQ measurement--.

Signed and Sealed this
Tenth Day of July, 2012

David J. Kappos
*Director of the United States Patent and Trademark Office*

CERTIFICATE OF CORRECTION (continued)
U.S. Pat. No. 7,639,989 B2

At claim 10, column 5, lines 34 & 35, after the words "request to" delete "begin CQ measurements" and insert therefor --take a CQ measurement--.

At claim 11, column 5, lines 38 & 39, after the words "method of" delete "minimizing overhead signaling and opti-mizing" and insert therefor --determining overhead signaling and--.

At claim 11, column 5, lines 41 & 42, after the words "request to" delete "begin channel quality (CQ) measurements;" and insert therefor --take a channel quality (CQ) measurement;--.

At claim 11, column 5, delete lines 44 & 45, and insert therefor --receiving a CQ measurement result in response to the request;--.

At claim 11, column 5, delete lines 46-48, and insert therefor --signaling an allocation of radio resources in response to the received CQ measurement result; and--.

At claim 12, column 5, lines 52 & 53, after the words "one of a" delete "particular coding rate, a modulation type and an allocated time slot." and insert therefor --coding rate and a modulation type.--.

At claim 13, column 5, lines 54 & 55, after the words "request to" delete "begin CQ measurements" and insert therefor --take a CQ measurement--.

At claim 14, column 5, lines 57 & 58, after the words "request to" delete "begin CQ measurements" and insert therefor --take a CQ measurement--.

At claim 14, column 5, line 59, after "CQ", delete "measurements are" and insert therefor --measurement is--.

At claim 15, column 6, lines 3 & 4, after the words "request to" delete "begin channel quality (CQ) measurements;" and insert therefor --take a Channel Quality (CQ) measurement;--.

At claim 15, column 6, lines 8 & 9, after the word "radio", delete "resources, the allocation of resources being based on" and insert therefor --resources in response to--.

At claim 16, column 6, lines 13 & 14, after the words "one of a" delete "particular coding rate, a modulation type and an allocated time slot." and insert therefor --coding rate and a modulation type.--.

At claim 17, column 6, lines 15 & 16, after the words "request to" delete "begin CQ measurements" and insert therefor --take a CQ measurement--.

At claim 18, column 6, lines 18 & 19, after the words "request to" delete "begin CQ measurements" and insert therefor --take a CQ measurement--.

At claim 18, column 6, line 20, after "CQ" delete "measurements are" and insert therefor --measurement is--.

At claim 19, column 6, lines 22 & 23, after the words "method of" delete "minimizing overhead signaling and opti-mizing" and insert therefor --determining overhead signaling and--.

At claim 22, column 6, line 40, after "CQ" delete "measurements." and insert therefor --measurement.--.